United States Patent
Johnston et al.

(10) Patent No.: US 11,748,858 B2
(45) Date of Patent: Sep. 5, 2023

(54) SYSTEMS AND METHODS FOR ADJUSTING APPEARANCE OF OBJECTS IN MEDICAL IMAGES

(71) Applicant: NuVasive, Inc., San Diego, CA (US)

(72) Inventors: Samuel Johnston, San Diego, CA (US); Sean O'Connor, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 0 days.

(21) Appl. No.: 17/616,558

(22) PCT Filed: Sep. 24, 2020

(86) PCT No.: PCT/US2020/052591
§ 371 (c)(1),
(2) Date: Dec. 3, 2021

(87) PCT Pub. No.: WO2021/062064
PCT Pub. Date: Apr. 1, 2021

(65) Prior Publication Data
US 2022/0207731 A1 Jun. 30, 2022

Related U.S. Application Data

(60) Provisional application No. 62/905,149, filed on Sep. 24, 2019.

(51) Int. Cl.
*G06T 5/00* (2006.01)
*G06T 3/40* (2006.01)
*G06T 5/40* (2006.01)
*G06T 7/00* (2017.01)
*G06V 10/50* (2022.01)
*G06V 10/44* (2022.01)

(52) U.S. Cl.
CPC .............. *G06T 5/008* (2013.01); *G06T 3/403* (2013.01); *G06T 5/40* (2013.01); *G06T 7/0012* (2013.01); *G06V 10/44* (2022.01); *G06V 10/50* (2022.01); *G06T 2207/10081* (2013.01); *G06T 2207/10116* (2013.01); *G06T 2207/20192* (2013.01); *G06T 2207/30052* (2013.01)

(58) Field of Classification Search
CPC . G06T 2207/20192; G06T 5/40; G06T 5/008; G06V 10/44; G06V 10/50
See application file for complete search history.

(56) References Cited

U.S. PATENT DOCUMENTS

| | | | |
|---|---|---|---|
| 4,691,366 A * | 9/1987 | Fenster | G06T 5/003 348/625 |
| 9,510,771 B1 * | 12/2016 | Finley | A61B 34/20 |
| 2004/0148057 A1 * | 7/2004 | Breed | G01S 7/4802 700/242 |
| 2008/0205764 A1 * | 8/2008 | Iwai | G06V 10/46 382/190 |

(Continued)

FOREIGN PATENT DOCUMENTS

| | | | |
|---|---|---|---|
| JP | 2010097436 A | * | 4/2010 |
| JP | 2010186274 A | * | 8/2010 |

(Continued)

*Primary Examiner* — Gandhi Thirugnanam
(74) *Attorney, Agent, or Firm* — Merchant & Gould P.C.

(57) ABSTRACT

Disclosed herein are systems and methods for enhancement of objects of interest in medical images.

15 Claims, 6 Drawing Sheets

(56) References Cited

U.S. PATENT DOCUMENTS

| | | | | |
|---|---|---|---|---|
| 2010/0034476 A1* | 2/2010 | Kido | ............... | G06V 10/7515 |
| | | | | 382/199 |
| 2010/0098338 A1* | 4/2010 | Kido | ............... | G06T 1/00 |
| | | | | 382/199 |
| 2010/0098339 A1* | 4/2010 | Kido | ............... | G06T 7/155 |
| | | | | 382/199 |
| 2012/0105681 A1* | 5/2012 | Morales | ............... | H04N 23/741 |
| | | | | 382/167 |
| 2013/0113791 A1* | 5/2013 | Isaacs | ............... | G06T 7/0016 |
| | | | | 345/682 |
| 2016/0117823 A1* | 4/2016 | Isaacs | ............... | G06T 3/20 |
| | | | | 715/863 |
| 2016/0163043 A1* | 6/2016 | Mimura | ............... | G06T 7/12 |
| | | | | 382/133 |
| 2017/0148154 A1* | 5/2017 | Nakao | ............... | G06T 7/0004 |
| 2017/0165008 A1* | 6/2017 | Finley | ............... | A61B 6/547 |
| 2017/0370901 A1* | 12/2017 | Ichitani | ............... | G06T 7/11 |
| 2018/0206807 A1* | 7/2018 | Baruth | ............... | H04N 5/232935 |

FOREIGN PATENT DOCUMENTS

| | | | |
|---|---|---|---|
| JP | 2012212967 A | * | 11/2012 |
| JP | 2017076168 A | * | 4/2017 |
| WO | 2003045263 | | 6/2003 |

* cited by examiner

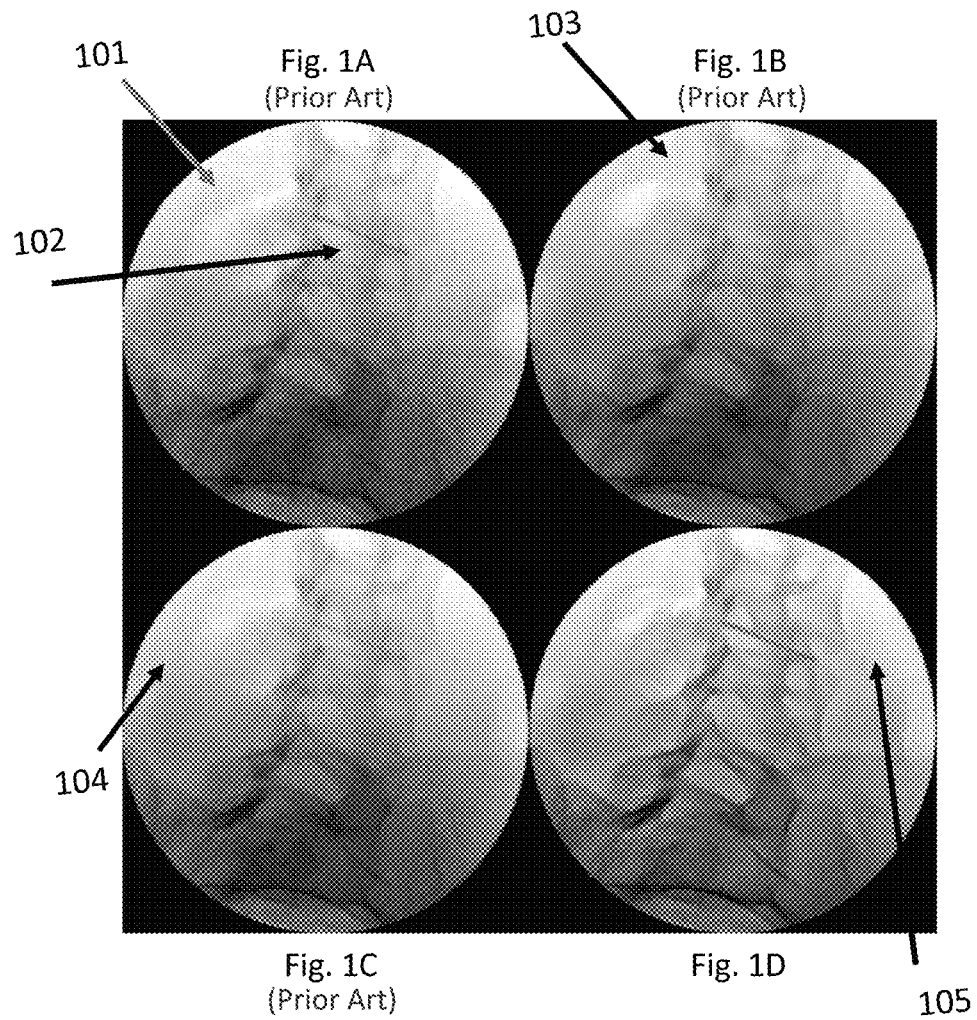
Fig. 1A (Prior Art)  Fig. 1B (Prior Art)
Fig. 1C (Prior Art)  Fig. 1D
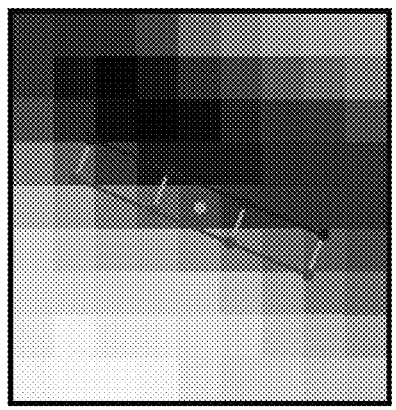
Fig. 2
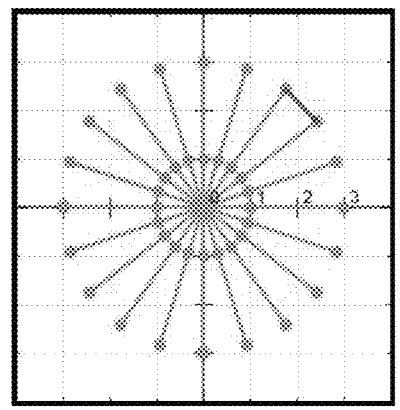
Fig. 3

Fig. 5
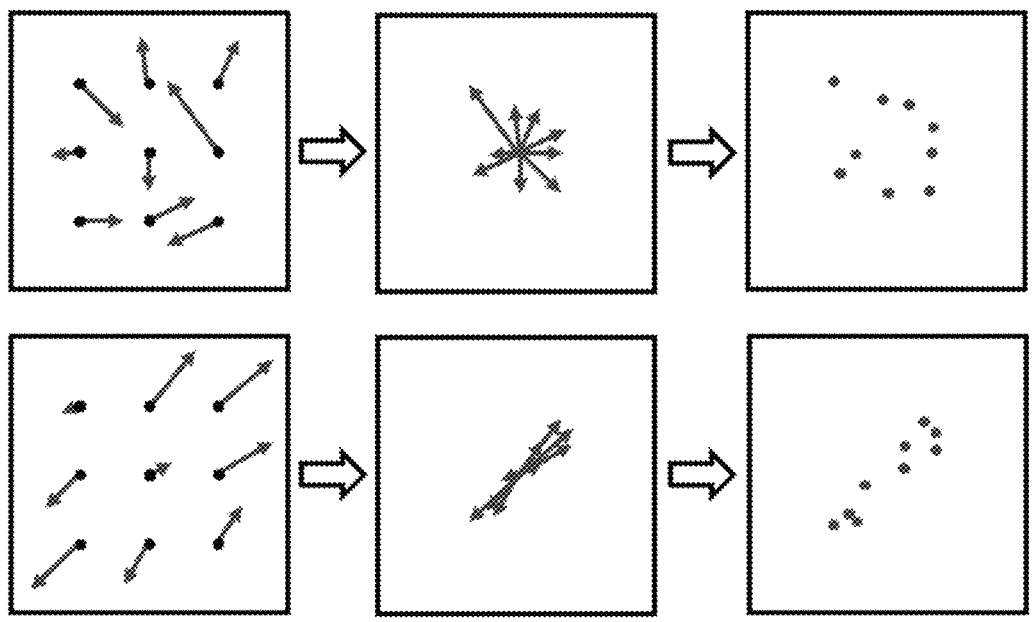
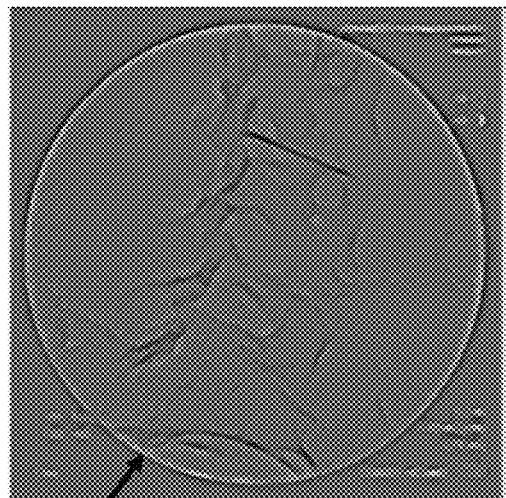
Fig. 6A
Fig. 6B
106
107

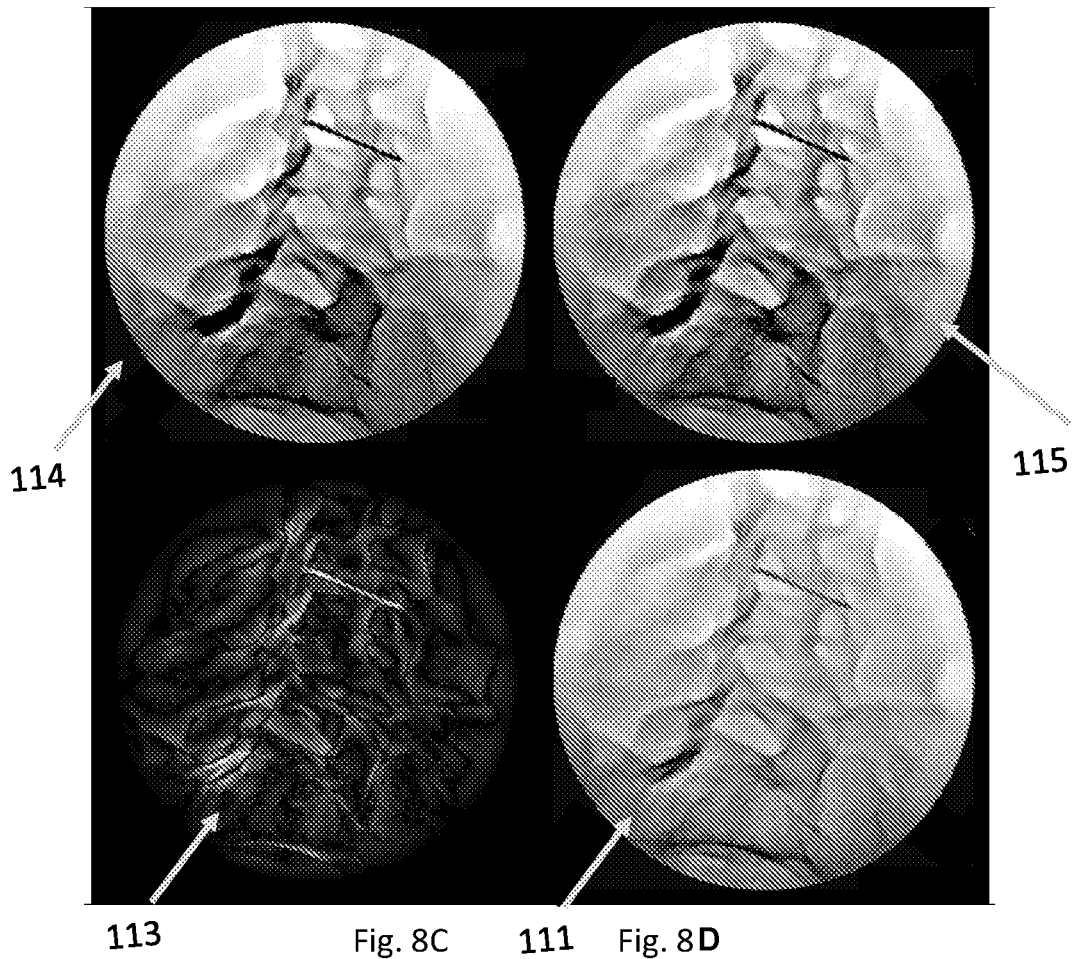
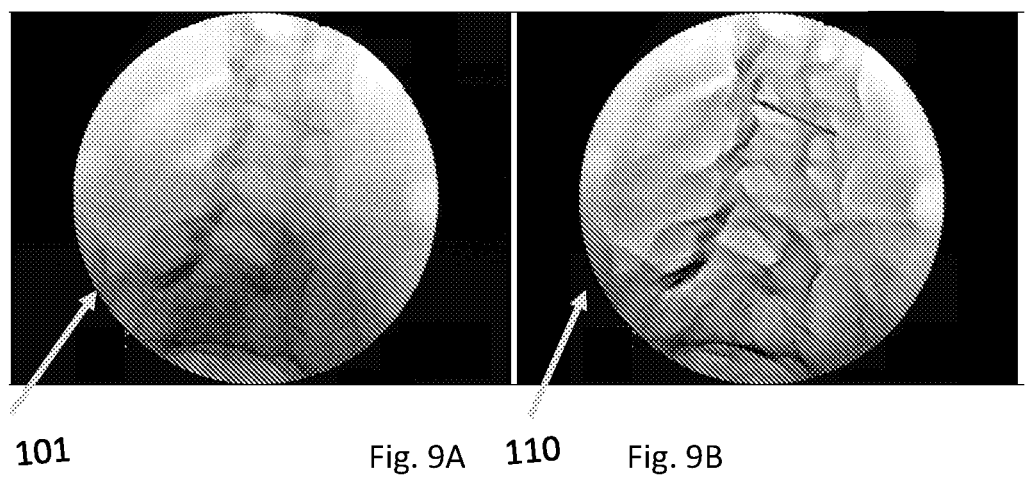

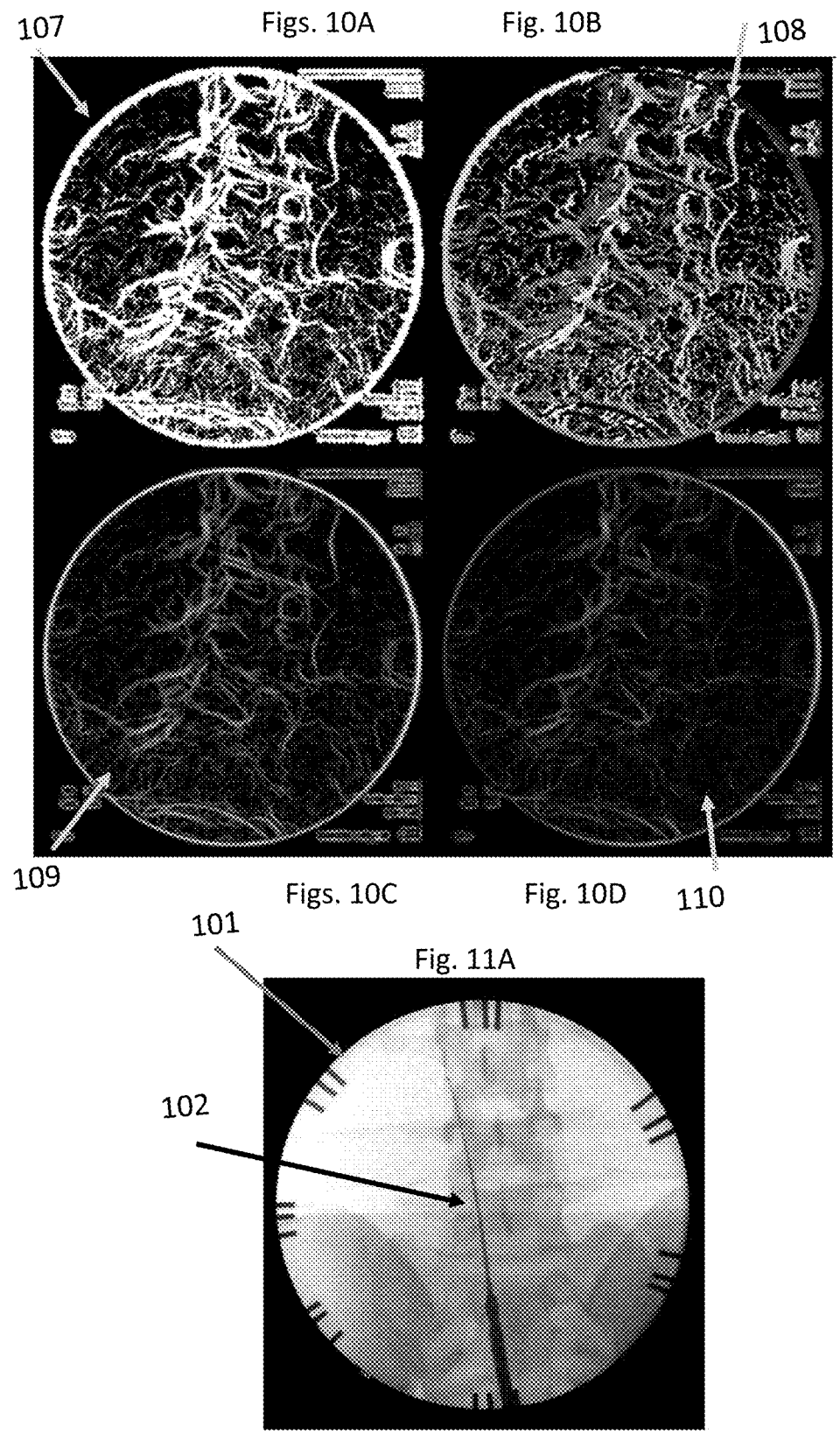

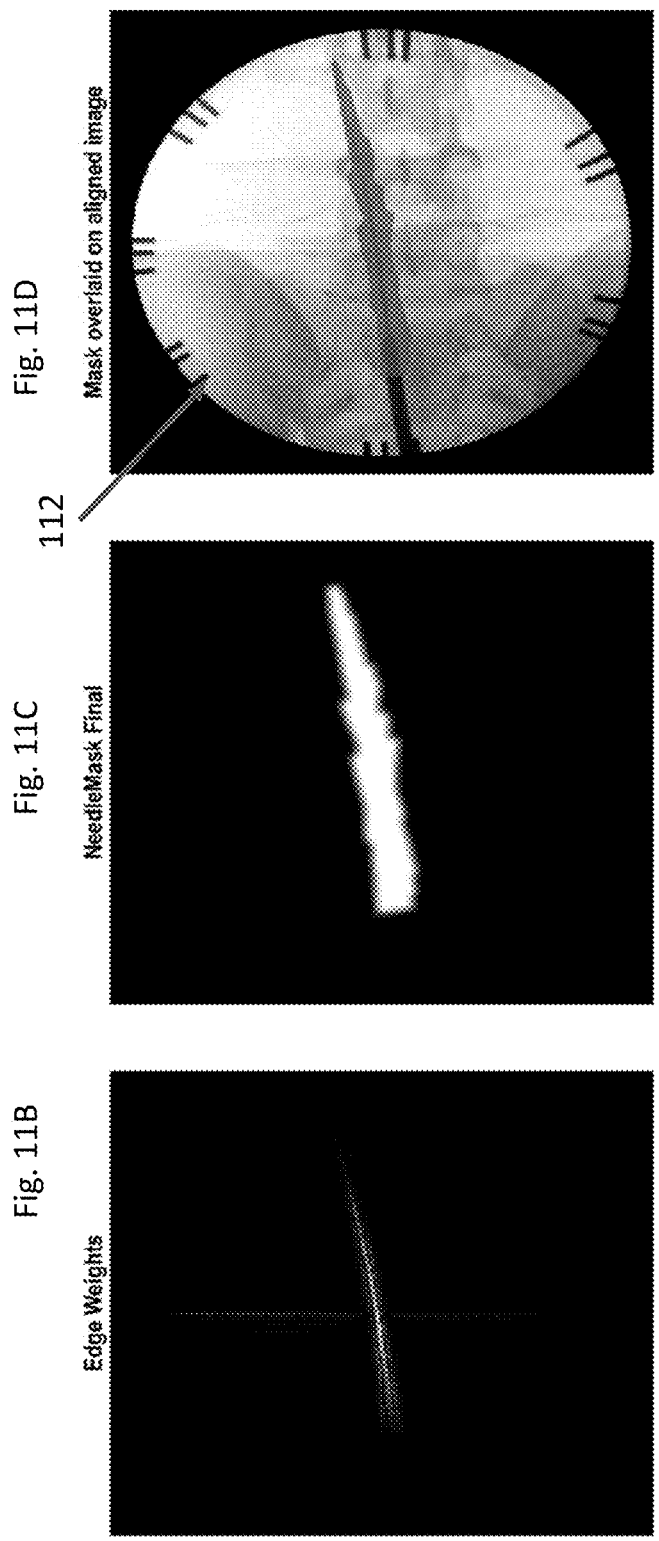

SYSTEMS AND METHODS FOR ADJUSTING APPEARANCE OF OBJECTS IN MEDICAL IMAGES

CROSS REFERENCE TO RELATED APPLICATIONS

This application is a national stage application under section 371 of PCT Application PCT/US2020/052591 filed Sep. 24, 2020, which is a non-provisional of, and claims the benefit of, U.S. provisional application No. 62/905,149 filed Sep. 24, 2019, the entire contents of which are hereby expressly incorporated by reference into this disclosure as if set forth in its entirety herein.

BACKGROUND

Medical imaging modalities such as computed tomography (CT), X-ray, or fluoroscopic generate a fair amount of ionizing radiation which has been identified as a potential cause for a host of medical problems.

SUMMARY

Image enhancement platform like LessRay are developed to take low-quality, low-dose images and improve them to look like conventional full-dose images. Image enhancement platforms like LessRay may offer the physician and hospital system the opportunity to use significantly reduced radiation imaging in the operation room. LessRay's fundamental scheme may rely on a "baseline" image (e.g., a high quality and full dose image) aligned with an overlapping lower-quality low dose "overlay" image. The overlay image may contain different information than the baseline image. As an example, the overlay image may contain surgical tools that only appear in the overlay image. The aligned composite image of the baseline and overlay image may provide high image quality to the information details that are only in the low-quality "overlay" image. However, image enhancement platforms may face various technical challenges due to its dependence on low quality, and low-dose of images. Metal objects such as surgical tools can become too faint in the standard flat blend of the two images, e.g., in the usual alternating blend, metal appears (intentionally) partially transparent.

Disclosed herein are systems and methods for adjusting appearance of objects of interest in the low-dose low quality images or in a conventional composite image of a baseline image and an overlay image where objects of interest are difficult to be unambiguously visualized.

Disclosed herein, in some embodiments, are methods for adjusting appearance of objects in medical images. The method herein may comprise receiving, by a computer, a raw image of a subject, the image containing one or more objects of interest; detecting edges in the image by generating a strength image and an index image, each pixel of the strength image representing strength of an edge centered at a corresponding pixel in the raw image and each pixel of the index image representing angle, length, or both of the edge centered at the corresponding pixel of the raw image; aggregating offset in the raw image by calculating an offset image and a directional correlation image, each pixel of the offset image representing an offset at the corresponding pixel in the raw image, the offset determined by a plurality of neighboring pixels to the corresponding pixel in the raw image, the strength, angle, length of an edge centered at each neighboring pixel, or a combination thereof, each pixel of the directional correlation image representing a eccentricity of a plurality of edges, each edge centered at one of the plurality of neighboring pixels; calculating an offset image for the raw image at each of a plurality of different image resolutions and adding the offset images to the raw image thereby generating an enhanced image; correcting a plurality of local histograms of the enhanced image, each local histogram from a portion of the enhanced image; and correcting a histograms of the enhanced image to be in a predetermined intensity range, thereby generating a corrected enhanced image.

Disclosed herein, in some embodiments, are methods for adjusting appearance of objects in medical images, the method comprising: receiving, by a computer, a raw image of a subject, the image containing one or more objects of interest; optionally rectify and rescale the raw image; detecting edges in the image by generating a strength image and an index image, each pixel of the strength image representing strength of an edge centered at a corresponding pixel in the raw image and each pixel of the index image representing angle, length, or both of the edge centered at the corresponding pixel of the raw image; optionally adjusting the strength image based on spatial gradient and standard deviation of the raw image; aggregating offset in the raw image by calculating an offset image and a directional correlation image, each pixel of the offset image representing an offset at the corresponding pixel in the raw image, the offset determined by a plurality of neighboring pixels to the corresponding pixel in the raw image, the strength, angle, length of an edge centered at each neighboring pixel, or a combination thereof, each pixel of the directional correlation image representing a eccentricity of a plurality of edges, each edge centered at one of the plurality of neighboring pixels; optionally calculating an offset image for the raw image at each of a plurality of different image resolutions and adding the offset images to the raw image thereby generating an enhanced image; optionally correcting a plurality of local histograms of the enhanced image, each local histogram from a portion of the enhanced image; calculating a weighting image, the weighting image optionally based on difference between the enhanced image and the raw image; correcting a histograms of the enhanced image to be in a predetermined intensity range, thereby generating a corrected enhanced image; and optionally merging the enhanced image or the corrected enhanced image with a baseline image or the raw image based on the weighting image thereby generating a merged enhanced image.

Disclosed herein, in some embodiments, are methods for adjusting appearance of objects in medical images, the method comprising: receiving, by a computer, a raw image of a subject, the image containing one or more objects of interest; detecting edges in the image by generating a strength image, an index image, or both; aggregating offset in the raw image by calculating an offset image, a directional correlation image, or both, each pixel of the offset image representing an offset at the corresponding pixel in the raw image, each pixel of the directional correlation image representing a eccentricity of a plurality of edges, each edge centered at one of the plurality of neighboring pixels; optionally calculating a weighting image, the weighting image based on difference between an enhanced image and the raw image; optionally correcting a histogram of the enhanced image to be in a predetermined intensity range, thereby generating a corrected enhanced image. In some embodiments, the method herein comprises rectifying and rescaling the raw image. In some embodiments, each pixel of the strength image represents strength of an edge centered at a corresponding pixel in the raw image and each pixel of the index image represents an angle, a length, or both of the edge centered at the corresponding pixel of the raw image. In some embodiments, the method further comprises adjusting the strength image based on spatial gradient and standard deviation of the raw image. In some embodiments, the offset is determined by a plurality of neighboring pixels to the corresponding pixel in the raw image, the strength, angle, length of an edge centered at each neighboring pixel, or a combination thereof. In some embodiments, the method further comprise calculating an offset image for the raw image at each of a plurality of different image resolutions and adding the offset images to the raw image thereby generating an enhanced image. In some embodiments, the method further comprises correcting a plurality of local histograms of the enhanced image, each local histogram generated from a portion of the enhanced image. In some embodiments, the method further comprises merging the enhanced image or the corrected enhanced image with a baseline image or the raw image based on the weighting image thereby generating a merged enhanced image. In some embodiments, the one or more objects comprise a radio-dense object. In some embodiments, the one or more objects comprise a metal object. In some embodiments, the one or more objects comprise a needle-like object. In some embodiments, the raw image of the subject is an X-ray image or CT image. In some embodiments, the raw image of the subject is an X-ray image or CT image. The method of any one of the preceding claims further comprising generating a mask using the enhanced image, the corrected enhanced image, or the weighting image. In some embodiments, the method further comprises superimposing the mask on the raw image or a baseline image thereby generating a masked image.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 1A-1D shows an example when a low-dose image with a needle (FIG. 1A) is merged with an anatomical baseline (FIG. 1B), in a conventional composite image, it becomes more difficult to see the needle (FIG. 1C), but the systems and methods for object enhancement herein can mitigate this problem (FIG. 1D);

FIG. 2 shows an exemplary embodiment of edge detection at a pixel of the raw image FIG. 1A;

FIG. 3 shows an exemplary embodiment of determining a number of angles for possible edges at each pixel;

FIG. 5 shows an exemplary embodiment of determining scaling of the offset of a pixel using the eccentricity of edges of its neighboring pixels;

FIG. 6A-6B shows an exemplary offset image (FIG. 6A) obtained using the aggregated offsets, and the directional correlation image (FIG. 6B) based on the neighborhood eccentricity of edges;

FIGS. 8A-8D shows an exemplary enhanced image after applying the offsets (FIG. 8A), local histogram correction (FIG. 8B), an exemplary weighting image for the determination of edge weights (FIG. 8C), and an exemplary corrected enhanced image after global histogram correction (FIG. 8D) using the methods and systems disclosed herein;

FIGS. 9A-9B shows an exemplary raw image and the corrected enhanced image after edge enhancement using the systems and methods disclosed herein;

FIGS. 10A-10D show exemplary images of the length (FIG. 10A), angle (FIG. 10B), strength (FIG. 10C) of the edges, and composite (FIG. 10D) using the systems and methods disclosed herein; and FIGS. 11A-11D shows exemplary edge mask generated using the systems and methods disclosed herein.

DETAILED DESCRIPTION

Figure 4:
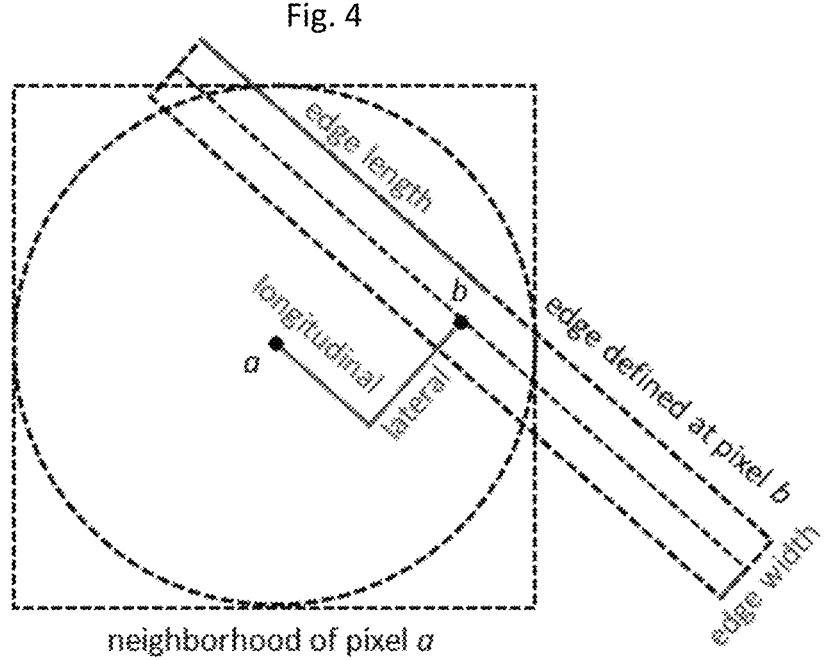
FIG. 4 shows an exemplary embodiment of determining the offset of a pixel using its neighboring pixels.

Disclosed herein, in some embodiments, are methods for adjusting appearance of objects in medical images. The method herein may comprise receiving, by a computer, a raw image of a subject, the image containing one or more objects of interest; detecting edges in the image by generating a strength image and an index image, each pixel of the strength image representing strength of an edge centered at a corresponding pixel in the raw image and each pixel of the index image representing angle, length, or both of the edge centered at the corresponding pixel of the raw image; aggregating offset in the raw image by calculating an offset image and a directional correlation image, each pixel of the offset image representing an offset at the corresponding pixel in the raw image, the offset determined by a plurality of neighboring pixels to the corresponding pixel in the raw image, the strength, angle, length of an edge centered at each neighboring pixel, or a combination thereof, each pixel of the directional correlation image representing a eccentricity of a plurality of edges, each edge centered at one of the plurality of neighboring pixels; calculating an offset image for the raw image at each of a plurality of different image resolutions and adding the offset images to the raw image thereby generating an enhanced image; correcting a plurality of local histograms of the enhanced image, each local histogram from a portion of the enhanced image; and correcting a histograms of the enhanced image to be in a predetermined intensity range, thereby generating a corrected enhanced image. Disclosed herein, in some embodiments, are methods for adjusting appearance of objects in medical images, the method comprising: receiving, by a computer, a raw image of a subject, the image containing one or more objects of interest; optionally rectify and rescale the raw image; detecting edges in the image by generating a strength image and an index image, each pixel of the strength image representing strength of an edge centered at a corresponding pixel in the raw image and each pixel of the index image representing angle, length, or both of the edge centered at the corresponding pixel of the raw image; optionally adjusting the strength image based on spatial gradient and standard deviation of the raw image; aggregating offset in the raw image by calculating an offset image and a directional correlation image, each pixel of the offset image representing an offset at the corresponding pixel in the raw image, the offset determined by a plurality of neighboring pixels to the corresponding pixel in the raw image, the strength, angle, length of an edge centered at each neighboring pixel, or a combination thereof, each pixel of the directional correlation image representing a eccentricity of a plurality of edges, each edge centered at one of the plurality of neighboring pixels; optionally calculating an offset image for the raw image at each of a plurality of different image resolutions and adding the offset images to the raw image thereby generating an enhanced image; optionally correcting a plurality of local histograms of the enhanced image, each local histogram from a portion of the enhanced image; calculating a weighting image, the weighting image optionally based on difference between the enhanced image and the raw image; correcting a histograms of the enhanced image to be in a predetermined intensity range, thereby generating a corrected enhanced image; and optionally merging the enhanced image or the corrected enhanced image with a baseline image or the raw image based on the weighting image thereby generating a merged enhanced image.

Disclosed herein, in some embodiments, are methods for adjusting appearance of objects in medical images, the method comprising: receiving, by a computer, a raw image of a subject, the image containing one or more objects of interest; detecting edges in the image by generating a strength image, an index image, or both; aggregating offset in the raw image by calculating an offset image, a directional correlation image, or both, each pixel of the offset image representing an offset at the corresponding pixel in the raw image, each pixel of the directional correlation image representing a eccentricity of a plurality of edges, each edge centered at one of the plurality of neighboring pixels; optionally calculating a weighting image, the weighting image based on difference between an enhanced image and the raw image; optionally correcting a histogram of the enhanced image to be in a predetermined intensity range, thereby generating a corrected enhanced image. In some embodiments, the method herein comprises rectifying and rescaling the raw image. In some embodiments, each pixel of the strength image represents strength of an edge centered at a corresponding pixel in the raw image and each pixel of the index image represents an angle, a length, or both of the edge centered at the corresponding pixel of the raw image. In some embodiments, the method further comprises adjusting the strength image based on spatial gradient and standard deviation of the raw image. In some embodiments, the offset is determined by a plurality of neighboring pixels to the corresponding pixel in the raw image, the strength, angle, length of an edge centered at each neighboring pixel, or a combination thereof. In some embodiments, the method further comprise calculating an offset image for the raw image at each of a plurality of different image resolutions and adding the offset images to the raw image thereby generating an enhanced image. In some embodiments, the method further comprises correcting a plurality of local histograms of the enhanced image, each local histogram generated from a portion of the enhanced image. In some embodiments, the method further comprises merging the enhanced image or the corrected enhanced image with a baseline image or the raw image based on the weighting image thereby generating a merged enhanced image. In some embodiments, the one or more objects comprise a radio-dense object.

In some embodiments, the one or more objects comprise a metal object. In some embodiments, the one or more objects comprise a needle-like object. In some embodiments, the raw image of the subject is an X-ray image or CT image. In some embodiments, the raw image of the subject is an X-ray image or CT image. The method of any one of the preceding claims further comprising generating a mask using the enhanced image, the corrected enhanced image, or the weighting image. In some embodiments, the method further comprises superimposing the mask on the raw image or a baseline image thereby generating a masked image.

Certain Terms

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As disclosed herein, the objects of interest, instruments, and/or surgical tools to be enhanced using the methods, systems, and media herein are not limited to metal. Such objects, instruments, and/or surgical tools may contain any material that may be opaque or dense in a sense that they can obstruct anatomical information. In some embodiments, when the imaging modality is radiography or X-ray related, the objects, instruments and/or surgical tools can be radiodense. With other imaging modalities, the objects, instruments, and/or surgical tools may not contain any metal but may contain one or more types of other materials that obstruct the anatomical information.

In some embodiments, the metal objects herein are equivalent to opaque objects or dense objects with the specific imaging modality used. For example, the metal objects disclosed herein may comprise glass or plastic is opaque when the imaging modality is Ultrasound.

In some embodiments, the baseline and overlay images disclosed herein can be acquired using one or more different imaging modalities, such as X-ray, CT, MRI, ultrasound, SPECT, PET, etc.

Overview

In some embodiments, the systems and methods herein enhance objects of interest in single medical images taken with various imaging modalities. The systems and methods may include various combination of method steps or operations disclosed herein.

In some embodiments, the systems and methods herein receive an input image, a raw image, or the like. The input image may be rectified to square dimensions and rescaled to a range of different resolutions (e.g., 512×512, 256×256, 128×128, 64×64). At each resolution, long edges, e.g., substantially straight edges, around each pixel in the image can be detected and some of the noise in the edge detection values can be suppressed. The edge detection values then can be used to calculate an offset to the edge detection value at each pixel of the raw image to reflect the aggregate of all the edge strengths in the neighborhood of that pixel. An offset image as shown in FIG. 6A may be generated. The aggregated values or the offset image produced by the preceding steps may be passed as input to metal detection for alignment of two or more images. Such alignment may be performed only when needed. The aggregated values or the offset image may be used for generating a mask for metal object(s) as shown in FIGS. 11A-11D.

The offsets from the different resolutions can then be combined into a weighted sum that is added to the raw image thereby generating an enhanced image, as shown in FIG. 8. The resulting enhanced image may have values that exceed the range of possible pixel values (0-255), and some regions of the image might appear much brighter or darker than others. A local histogram equalization at different regions of the image can be performed so that they are each brought into an acceptable range, with a smooth transition between each region. Afterwards, a global histogram equalization can be applied to bring the entire image into an acceptable intensity range.

When the enhanced image is to be merged or aligned with another enhanced image, the merge may favor those parts of the input images where the edges are strongest, and ignore those parts of the input images where the edges are weak. These regions can be identified by subtracting the raw image from the enhanced image (which includes both the added offsets and the local histogram equalization). These edge weights can be computed and saved for usage for merging.

When the merge of two images is performed, each pixel of the merged or aligned image can be assigned a weighted sum of the two raw images and the two enhanced images, with the edge weights calculated in prior steps contributing to the weights in the weighted sum.

Edge Detection

In some embodiments, the systems and methods include receiving a raw image 101 of a subject as an input, the image containing one or more objects of interest 102, e.g., an implant or a surgical tool. The raw image may be rectify and rescaled. For a long edge detection process, the output can be two image arrays. Each pixel of the first image or image array (the strength image, e.g., FIG. 10C) may contains a value representing the strength of the strongest edge that is centered at each corresponding pixel in the raw image, and each pixel of the second image or image array (the index image) may contain an index that encodes the angle (e.g., FIG. 10B), length (e.g., FIG. 10A), or both of the strongest edge at each corresponding pixel in the raw image.

To generate such two image arrays, the edge detection function may operate at multiple pixels or even all pixels in the raw image in parallel. At each pixel, the edge detection process may search over a range of angles and a range of edge lengths. At each combination of angle and length, it can construct an edge of that angle and length centered on the pixel, and calculate a strength value that describes how well that edge divides the neighborhood into two halves that are darker on one side and lighter on the other side. The search over edge length can be cumulative, so that the strength associated with a particular length can included in the strength of the next highest edge length.

The difference between light and dark calculated at two pairs of samples located at opposite ends of the edge. When the search is advanced to the next angle and the length is set to the minimum, the test samples are all in close proximity, and as the length is incremented the two pairs move farther apart.

Difference function can be used to indicate the difference of grayscale values between the two samples in a pair. As an example, the cube root of the difference of grayscale values between the two samples in a pair can be used to calculate the difference function if it is more important to be able to discern a row of pixels that are consistently darker than their partners, even if the difference is relatively small, than to catch a few extremely dark or light pixels.

The strength can be calculated as the sum of the difference functions for the two pairs, plus the strength of the edge at the previous length increment for this angle, minus a penalty. The penalty may be needed because otherwise longer edges may almost always yield higher strengths, even if they have gaps in the middle. The penalty may also have the effect of suppressing the impact of noise.

FIGS. 1A-1D shows a low-dose image 101 with an object 102. When the low dose image is merged with an anatomical baseline image 103, in a conventional composite image 104 as in FIG. 1C, it becomes more difficult to see the needle 102, but the systems and methods for object enhancement herein greatly improve image quality of a conventional composite image and may allow much easier and more accurate detection of the object in an enhanced image 105 as shown in FIG. 1D.

FIG. 2, in an exemplary embodiment, shows a close-up of the low dose needle image 101 in FIG. 1A. In this embodiment, the edge detection process is searching for edges that pass through the pixel indicated by the dot. The current searching angle is the angle corresponding to the angle of the longer segments. It has completed two length steps, stepping away from the green dot in both directions, accumulating a total of four pairs of samples, indicated by the shorter segments. At each sample pair, the difference between the inner value (lower dot) and the outer value (higher dot) is passed to the difference function. This combination of angle and length may yield the highest score because the inner samples are all brighter than the outer samples.

For the search over all angles and lengths, a running maximum strength can be kept, along with the associated index, which encodes the angle and length that generated that strength.

In some embodiments, the edge detection process may take as input one or more of the following geometric parameters:

The number of angles to search, which can be distributed at equal intervals around a circle;

The number of lengths to search, which can be distributed at equal increments starting from one increment;

The length step, the increment between lengths;

The width of the edge. More precisely, it is the pixel distance between a sample and the edge line, so the distance between a pair of samples will be twice this value; and The penalty of the difference function.

FIG. 3, in an exemplary embodiment, shows how the number of angles is determined. In this case, the number of lengths to search is 2, and the step length is 2, so there are at most 4 sample pairs at each angle, spanning 6 pixels from end to end. Each search angle can be represented by a segment. The farthest distance between samples at successive search angles is indicated by the segment connecting two adjacent radially distributed segments. Such segment may be no longer than the maximum distance, which in this case is set as 1.5. So the minimum number of angles that can ensure that the segment is no longer than 1.5 can be found, and we round this number up to the nearest multiple of 4, yielding 20 angular steps. In this diagram, there appear to be only 10 segments, but that is because the number is even and the segments are overlaid. Another way to look at it: for each segment in the drawing, imagine that it represents two different edges, one that divides light on the left from dark on the right, and another that divides light on the right from dark on the left.

Edge Denoising

The long edge detection step can be sensitive to noise. In a noisy image, it is common to detect a surfeit of spurious little edges that do not correspond to anatomy or surgical instruments. In this step, a noise suppressor can be employed that makes use of two filtered images that are generated as part of the process of object detection, e.g., the gradient and the local standard deviation image of the raw image. The local standard deviation is a measure of how much change is going on in neighborhood pixels without regard to its spatial distribution, while the gradient is a measure of how the change is directionally oriented. Both the gradient and the standard deviation can return large values in the presence of anatomical edges as well as in the presence of noise. But the ratio of the gradient to the standard deviation may distinguish the relative contribution of anatomical edges from the relative contribution of noise.

The systems and methods herein may take the gradient image and the local standard deviation image that can be generated from the raw image, calculates the ratio, and adjusts this ratio by an exponent. The edge strength that can be found in the edge detection process can be scaled by this amount. The result can be reduction in the noise of the edge strengths.

Offset Aggregation

The systems and methods may include a step that aggregates offset of each pixel. This step may take as input the edge strengths and indices that are generated in the edge detection step and returns as outputs two image arrays. The first image or image array may contain an offset to the value in the raw image that is to be applied at each pixel, and the second image may contain a measure of the directional correlation of the neighborhood of edges around each pixel.

To generate such two image arrays, the offset aggregation process may operate at multiple pixels or even all pixels in the raw image in parallel. At each pixel, it can searched over a circular neighborhood inscribed within a square neighborhood centered on that pixel (the home pixel). Alternatively, it is possible to search over all pixels in that neighborhood, or over an evenly-spaced subset of that neighborhood determined by a pixel increment. This increment can be increased above 1 or another number if it is necessary to reduce the runtime of the function, but at the cost of a loss of precision.

For each neighboring pixel, the strength, angle, and length of the strongest edge that passes through the neighboring pixel can be obtained. As an exemplary embodiment, in FIG. 4, at each pixel a, all pixels b in the neighborhood are examined to determine the lateral and longitudinal distance from a to b in terms of the edge that passes through b. The longitudinal distance corresponds to a value normalized to the edge length, so that a value of 1 corresponds to one edge length) and the lateral distance corresponds to a value expressed in pixels). For pixel a to receive an offset, it can have the longitudinal distance between −1 and 1, and lateral distance greater than the edge width. The larger the lateral and longitudinal distances, the smaller the offset. The offset can be positive or negative depending on whether pixel a is on the dark side or the light side of the edge that passes through b.

The angle and length can be used to construct an edge vector representing that edge. The pixel vector can be constructed from the neighboring pixel to the home pixel. A vector projection can be performed in order to decompose the pixel vector into a lateral component that is perpendicular to the pixel vector and a longitudinal component that is parallel to the pixel vector. If the longitudinal component exceeds the length of the edge, then the home pixel lies beyond the edge in question, and there may be no contribution to the offset. If the lateral component is less than the width of the edge, then the home pixel lies in the gap between the light side and the dark side, and there may be no contribution to the offset. Otherwise, the contribution of the edge at the neighboring pixel to the offset at the home pixel can be directly proportional to the edge strength, and inversely proportional to the lateral and longitudinal distances. An edge has a light side and a dark side; the offset contribution can be positive or negative based on which side of the edge the home pixel lies.

If the edges in the neighborhood around the home pixel consistently point in the same direction, the offset applied to the home pixel may be emphasized, whereas if the edges appear to be pointing over a range of different directions, the offset may be suppressed. To express this quantitatively, the set of vectors in the neighborhood can be treated as a set of points distributed in space as in FIG. 5. If the vectors are correlated, the distribution of these points can be long and thin, whereas if they are uncorrelated, the distribution may resemble a circle. The distribution can be considered as an ellipse and the major and minor axes can be found. The ratio of the major to minor axes, that is, the eccentricity of the ellipse, can be an exemplary measure of directional correlation to scale the offset to the home pixel.

As shown in FIG. 5, in the pixel neighborhood on the top left panel, the edges all point in different directions, and when the vectors are gathered together (middle panel), the points defined by the tips are spread around in a blob (right panel), corresponding to a low eccentricity. In the pixel neighborhood on the bottom left panel, the edges all point along in similar directions, and when the vectors are gathered together (middle panel), the points defined by the tips appear to be distributed close to a line (right panel), corresponding to a high eccentricity.

The axes of the ellipse can be determined as the eigenvectors of the covariance matrix of the distribution, and their magnitudes are the corresponding eigenvalues. The ratio of the eigenvalues can be used herein. In order to find this, a covariance matrix of the length vectors in the neighborhood can be generated. The elements of the covariance matrix can be assembled from a set of running sums and running squared sums that are accumulated over the main loop through the neighborhood. Upon completing the loop, the covariances are computed, and we use the quadratic formula to solve the characteristic equation of the covariance matrix. Instead of solving for the eigenvalues explicitly, we have rearranged the equation to cut out some intermediate steps, and added some safeguards against the numerical singularities that might arise along the way.

The offset to be applied to the home pixel is scaled by the eccentricity. Both the offset and the eccentricity are returned as outputs. FIGS. 6A-6B show exemplary image of the aggregated offsets 106 (FIG. 6A, range from −143 to 150) and the neighborhood eccentricity 107 (FIG. 6B, range from 1 to 9) of the long edges at resolution 256×256.

The systems and methods can generate the long edge detection array, e.g., the strength image (109), and/or the index image (107, 108), the offset array 106, and the eccentricity array or directional correlation array 107 at each resolution. One or more of these arrays can be used as possible discriminators for use in metal detection. One or more of these arrays can be used for generating a mask based on edge detection as shown in FIGS. 11A-11D Application of offsets The offsets at each resolution can be summed together at each pixel. The sum of the offsets can be added to the raw image at the selected resolution, e.g., 512×512, thereby generating an enhanced image.

In order to eliminate the spurious high intensity edges at the perimeter of the image, a weight can be applied to the sum of the offsets. A weight function that has a value of 1 throughout most of the interior of the image, and smoothly rolls off to 0 at the perimeter can be used.

Local Histogram Correction

After adding the sum of the offsets to the raw image 101, the resulted enhanced image may have a range of pixel values in which the dark regions may go below 0 and the bright regions may go above 255. A local histogram correction can be applied to the enhance image.

The systems and methods herein can find different histograms for different regions of the image and apply different local histogram corrections to advantageously preserve contrast and image quality of anatomical features and objects of interest.

Figure 7:
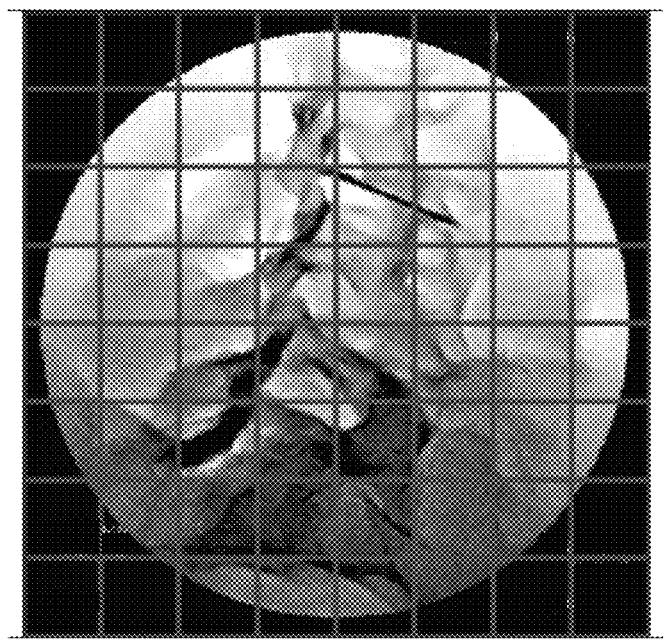
FIG. 7 shows an exemplary image with regions for calculating local histograms.

Each local histogram correction can generate an offset to the value at each pixel in the image. Ultimately, each pixel may receive an aggregate offset that is a weighted sum of the offset functions generated in the different regions of the image, where the weights are proportional to the proximity of the pixel to the center of each region. FIG. 7 shows exemplary regions for local histogram correction. In this example, the image is 512×512, and the regions are 64×64.

The initial construction of the local histograms is performed in parallel at each pixel in the enhanced image that was generated in the previous step(s). The local histograms are maintained in a three-dimensional structure in which the x and y axes correspond to the region of the image and the z axis corresponds to the pixel value. In an example, there are 8×8 regions, each region of size 64×64 pixels, and there are 768 histogram bins accommodating a range of possible values from −255 to 511. The size of the histogram regions can be adjusted. The function determines the three-dimensional histogram index of each pixel in the image, and increments the histogram count at that index. Pixels that lie outside the circular window in the original X-ray image are ignored.

Once this three-dimensional histogram is populated, the regional histograms are used to generate regional lookup tables that indicate the offset that is to be applied to each pixel value. It first steps through each bin and replaces the histogram with a cumulative histogram. Then it steps through each bin and uses the cumulative histogram value as an input into the inverse error function to calculate the offset. The standard deviation of the desired distribution can be adjusted. Finally, the histogram correction is applied to the image. In this function, the indices are fractional values rather than integer values. The histogram correction is obtained using the linear interpolation. To attenuate the visual effect of exaggerated edges, the histogram correction is scaled. For example, a value of 0 means that no correction is applied, while a value of 1 means that the full correction is applied. The correction can also be scaled by the radial weight which has the effect of constraining the correction to the interior of the image while leaving the circular perimeter of the image unaffected.

Edge Weights

In some embodiments, edge weights are given to favor the relative contributions of regions that have a high degree of visual interest. For example, suppose a portion of the baseline image appears relatively homogeneous. Then a surgical tool appears in a subsequent image that is to be merged to the baseline image. The homogeneous region is relatively unaffected by the preceding edge enhancement process, but a very strong offset is generated around the outline of the tool. In the merge, we want the tool to stand out nice and sharp over the homogeneous background.

To achieve this, the absolute difference between the enhanced image and the original image at each pixel can be calculated. Then the maximum of the absolute difference image can be found and used to scale the absolute difference to the range 0-1.

Global Histogram Correction

Global histogram correction can be applied to the enhanced image in order to bring it into the desired range e.g., 0 to 255. This step can use a single histogram with a linear correction for the whole image, rather than different histograms with normal distributions for different regions.

The global histogram can be generated with ignoring those pixels that fall outside the circular perimeter of the raw image. Then it is converted into a cumulative histogram, a low cutoff and a high cutoff are calculated from the percentiles of the cumulative histogram, and a linear transformation is applied that sets all gray values below the low cutoff to 0 and all values above the high cutoff to 255. A weighted addition is performed between the enhanced image with the global correction and the enhanced image without the global correction. The weight can be the radial weight disclosed herein that is employed as 1 in the interior of the image and rolls off to 0 at the circular perimeter. This has the effect of removing a spurious dark band near the edge of the image which is introduced by the local histogram correction. This yields the enhanced images 111 as shown in FIGS. 8A-8D.

FIGS. 8A-8D shows exemplary image after the operations of applying the offsets, (FIG. 8A), local histogram correction (FIG. 8B), the determination of edge weights (FIG. 8C), and global histogram correction (FIG. 8D). One or more of the operations may be used to generate desired enhancement in the enhanced image 105, 110, 111, 114, 115. In some embodiments, all images besides the edge weights are shown in the range 0 to 255. The edge weights can be in the range 0 to 1.

The systems and methods herein can receives the raw image 101, optionally perform bounds detection, rectify the image to a desired resolution and size, e.g., 512×512, and can get the enhanced image 110, 111, 105 using the methods disclosed herein. The enhanced image can be restored it to the original dimensions, and be generate as an output or as an input to a caller. The systems and methods may merge the raw image 101 with the enhanced image based on the weighting image 113, e.g., as shown in FIG. 8C, thereby generating a merged enhanced image 111

As shown in FIG. 9A, in the raw image it is difficult to precisely locate some of the bony features, but after applying the long edge enhancement those features become much shaper in the enhanced image 110 (FIG. 9B) or the corrected enhanced image 111 (FIG. 8D).

Long Edge Diagnostics

The systems and methods may provide a process that aids in the visualization of the results of long edge detection. It can take as input the image array that contains the index that encodes both the length and angle of the long edges, and it can also take one or more of the parameters that describe the edge search range (number of angles, number of lengths, length increment). It returns as output an image array containing the length of the strongest edge at each pixel and an image array containing the angle of the strongest edge at each pixel.

Such visualization may include a color image in which the angle maps to hue and the strength maps to value (brightness). As shown in FIGS. 10A-10D, in some particular embodiments, the length image (FIG. 10A, range from −1 to 3), angle image (FIG. 10B, range from 0 to $2\pi$), strength image (FIG. 10C, range from 0 to 46) can be combined to a composite (FIG. 10D) image produced by the long edge enhancement process at the resolution 256×256.

In some embodiments, the edge-enhancement method described herein can be extended to assist in enhancement of objects of interest such as medical instruments. The medical instruments may have stronger edge strengths due to being longer and/or straighter than typical anatomical features. In some embodiments, the edge-detection methods herein are tuned, e.g., by adjustment of parameters, to detect longer, darker edges than what typical anatomical features may have, the methods disclose herein are selective for enhancement of artificial instruments.

For example, the X-Ray image 101 in FIG. 11A contains a long straight needle-like instrument 102. In some cases, it is beneficial to detect and selectively enhance this instrument in the image. As an example, a "mask" which labels each pixel in the image as being either contained inside the needle, or outside the needle may be desired. The mask can then be used to guide other enhancement techniques to be applied only to the needle, thus enhancing the appearance of the instrument relative to the anatomy.

By tuning the parameters of the edge-enhancement methods, the output of the methods may have high strength for pixels along the needle, and lower strength for pixels outside of the metal. FIG. 11B shows the output of the methods herein when tuned in this manner to the raw image 101 in FIG. 11A. The filter output can then be converted into a "mask", indicating the strength of belief that any given pixel is contained inside the needle, and/or sufficiently near the needle that enhancement is desired. FIG. 11C shows one example of such a mask. In this embodiment, the edges of the mask have been blurred so that the transition from black (outside needle) to white (in needle) is gradual instead of abrupt. In FIG. 11D, the mask is overlaid onto the raw image or another baseline image to generate a masked image 111 which demonstrates how it isolates the region of the image containing the needle.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method disclosed herein, the operations may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the systems, and/or devices described herein may be embodied as integrated components or as separate components.

What is claimed is:

1. A method for adjusting appearance of objects in medical images, the method comprising:
   receiving, by a computer, a raw image of a subject, the raw image containing one or more objects of interest;
   rectifying and resealing the raw image into a plurality of different image resolutions;
   detecting edges in the raw image by generating a strength image and an index image, each pixel of the strength image representing strength of an edge centered at a corresponding pixel in the raw image and each pixel of the index image representing (i) an angle of the edge centered at the corresponding pixel of the raw image; (ii) a length of the edge centered at the corresponding pixel of the raw image, or both (i) and (ii);
   aggregating offset in the raw image by calculating a first offset image and a directional correlation image,
      wherein each pixel of the first offset image represents an offset at the corresponding pixel in the raw image, the offset determined by one or more parameters associated with a plurality of neighboring pixels to the corresponding pixel in the raw image, wherein the one or more parameters include: (iii) strength of an edge centered at one of the plurality of neighboring pixels, (iv) an angle of the edge centered at one of the plurality of neighboring pixels, (v) length of the edge centered at each of the plurality of neighboring pixels, or a combination of (iii), (iv) and/or (v), and
      wherein each pixel of the directional correlation image represents an eccentricity value associated with plurality of edges, wherein each of the plurality of edges is centered at one of the plurality of neighboring pixels;
   calculating an additional offset image for the raw image at each of the plurality of different image resolutions and combining the offsets of the first offset image and the offsets of the additional offset images into a weighted sum, wherein the weighted sum is added to the raw image at a selected resolution thereby generating an enhanced image; and
   generating a corrected enhanced image from the enhanced image by correcting one or more pixel values of one or more regions of the enhanced image to be within a predetermined intensity range.

2. The method of claim 1, wherein the one or more objects comprise a radio-dense object.

3. The method of claim 1, wherein the one or more objects comprise a metal object.

4. The method of claim 1, wherein the one or more objects comprise a needle-like object.

5. The method of claim 1, wherein the raw image of the subject is an X-ray image or CT image.

6. A method for adjusting appearance of objects in medical images, the method comprising:
   receiving, by a computer, a raw image of a subject, the raw image containing one or more objects of interest;
   rectify and rescale the raw image into a plurality of different image resolutions;
   detecting edges in the raw image by generating a strength image and an index image, each pixel of the strength image representing strength of an edge centered at a corresponding pixel in the raw image and each pixel of the index image representing: (i) an angle of the edge centered at the corresponding pixel of the raw image; (ii) a length of the edge centered at the corresponding pixel of the raw image, or both (i) and (ii);
   adjusting the strength image based on spatial gradient and standard deviation of the raw image;
   aggregating offset in the raw image by calculating a first offset image and a directional correlation image,
      wherein each pixel of the first offset image represents an offset at the corresponding pixel in the raw image, the offset determined by one or more parameters associated with a plurality of neighboring pixels to the corresponding pixel in the raw image, wherein the one or more parameters include: (iii) strength of an edge centered at one of the plurality of neighboring pixels, (iv) an angle of the edge centered at each of the plurality of neighboring pixels, (v) a length of the edge centered at one of the plurality of neighboring pixels , or a combination of (iii), (iv) and/or (v), and
      wherein each pixel of the directional correlation image represents an eccentricity value associated with a plurality of edges;
   calculating an additional offset image for the raw image at each of the plurality of different image resolutions and combining the offsets of the first offset image and the offsets of the additional offset images into a weighted sum, wherein the weighted sum is added to the raw image at a selected resolution thereby generating an enhanced image;

applying a local histogram correction to a plurality of regions of the enhanced image;

calculating a weighting image, the weighting image based on difference between the enhanced image and the raw image;

generating a corrected enhanced image by correcting one or more pixel values of one or more regions of the enhanced image to be within a predetermined intensity range; and merging the enhanced image or the corrected enhanced image with a baseline image or the raw image based on the weighting image thereby generating a merged enhanced image.

7. The method of claim 6 further comprising generating a mask using the enhanced image, the corrected enhanced image, or the weighting image.

8. The method of claim 7, further comprising superimposing the mask on the raw image or the baseline image thereby generating a masked image.

9. A method for adjusting appearance of objects in medical images, the method comprising:

receiving, by a computer, a raw image of a subject, the raw image containing one or more objects of interest;

detecting edges in the raw image by generating (i) a strength image, (ii) an index image, or (iii) both (i) and (ii), wherein the strength image is a first image output of a long edge detection process performed on the raw image, and the index image is a second image output of the long edge detection process performed on the raw image;

rectifying and resealing the raw image into a plurality of different image resolutions;

aggregating offset in the raw image by calculating a first offset image,
  wherein each pixel of the first offset image represents an offset at a corresponding pixel in the raw image, and
  wherein each pixel of a directional correlation image represents an eccentricity of each edge of a plurality of edges, wherein each of the plurality of edges is centered at one of a plurality of neighboring pixels to the corresponding pixel in the raw image;

calculating an additional offset image for the raw image at each of the plurality of different image resolutions and combining the offsets of the first offset image and the offsets of the additional offset images into a weighted sum, wherein the weighted sum is added to the raw image at a selected resolution thereby generating an enhanced image; and applying a histogram correction to the enhanced image to bring the enhanced image within a predetermined intensity range, thereby generating a corrected enhanced image.

10. The method of claim 9, further comprising rectifying and resealing the raw image.

11. The method of claim 9, wherein each pixel of the strength image represents strength of an edge centered at the corresponding pixel in the raw image and each pixel of the index image represents (iv) an angle of the edge centered at the corresponding pixel of the raw image, (v) a length of the edge centered at the corresponding pixel of the raw image, or both (iv) and (v).

12. The method of claim 11, further comprising adjusting the strength image based on a spatial gradient and a standard deviation of the raw image.

13. The method of claim 11, wherein the offset is determined by one or more parameters associated with the plurality of neighboring pixels to the corresponding pixel in the raw image, the one or more parameters including: (vi) strength of an edge centered at each neighboring pixel, (vii) angle of the edge centered at each neighboring pixel, (viii) length of the edge centered at each neighboring pixel, or a combination of (vi), (vii) and/or (viii).

14. The method of claim 13 further comprising correcting a plurality of local histograms of the enhanced image, each local histogram generated from a portion of the enhanced image.

15. The method of claim 9 further comprising correcting a plurality of local histograms of the enhanced image, each local histogram generated from a portion of the enhanced image.

* * * * *